United States Patent [19]
Barton

[11] 3,888,152

[45] June 10, 1975

[54] ADJUSTABLE ANGLE DOUBLE CUTTING MITRE CUT-OFF SAW

[76] Inventor: Glen B. Barton, P.O. Box 127, Calhoun City, Miss. 38916

[22] Filed: Feb. 6, 1974

[21] Appl. No.: 439,859

[52] U.S. Cl. .................. 83/471.3; 83/473; 83/477; 83/486.1
[51] Int. Cl... B23d 45/14; B23d 45/10; B23d 47/00
[58] Field of Search ........ 83/477, 486.1, 471.3, 473

[56] References Cited
UNITED STATES PATENTS

| | | | |
|---|---|---|---|
| 1,700,683 | 1/1929 | Madsen | 83/471.3 X |
| 2,719,547 | 10/1955 | Gjerde | 83/471.3 |
| 2,918,950 | 12/1959 | Le Tarte | 83/471.3 |

*Primary Examiner*—Willie G. Abercrombie
*Attorney, Agent, or Firm*—Clarence A. O'Brien; Harvey B. Jacobson

[57] ABSTRACT

A cut-off saw is provided including a base having means defining a workpiece support surface and a workpiece guiding fence adjacent, extending along and projecting outwardly from the workpiece support surface. A pair of driven rotary saw blades are provided and supported in relatively angulated planes disposed generally normal to the workpiece support surface with corresponding marginal portions of the blades closely adjacent each other and the line along which the planes in which the blades are disposed intersect. The structure supporting the blades enables the blades to be moved in the aforementioned relatively angulated planes toward and away from the workpiece supporting surface and those planes to be adjustably angularly displaced relative to each other about coinciding axes at least closely adjacent and generally paralleling the line along which the planes intersect. The rotary saw blades may be selectively and independently moved toward and away from the workpiece support surface as well as simultaneously moved toward and away from the workpiece support surface.

13 Claims, 14 Drawing Figures

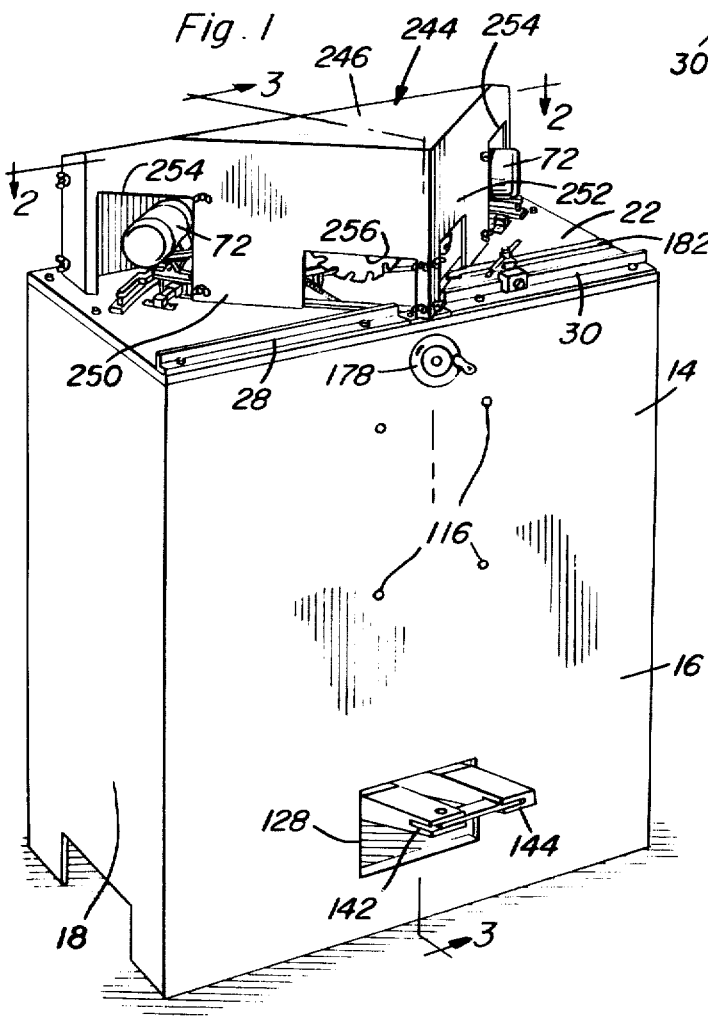
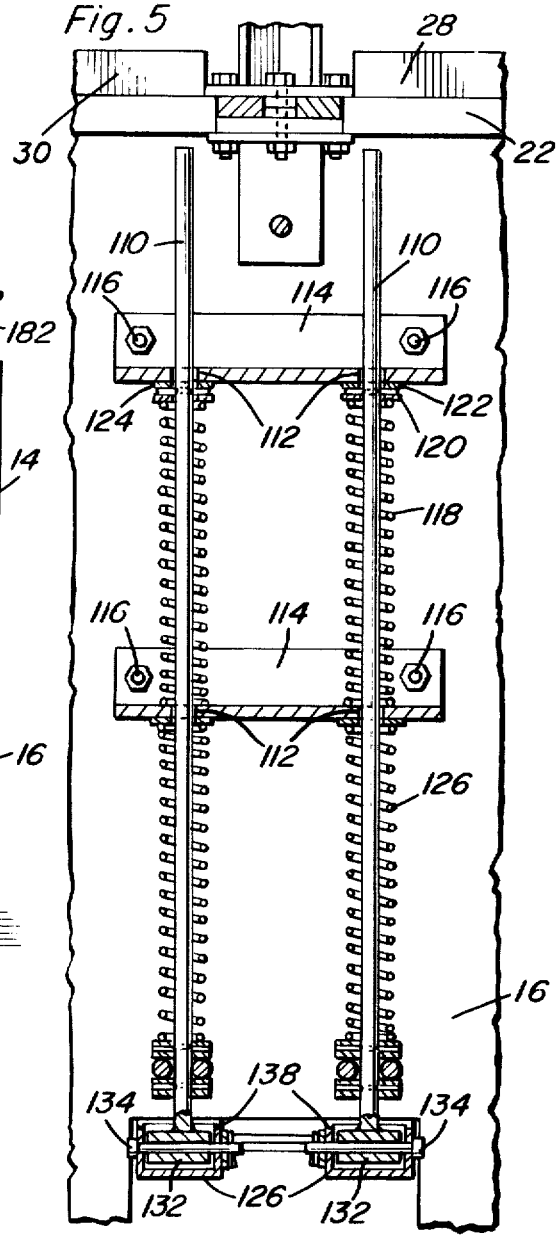
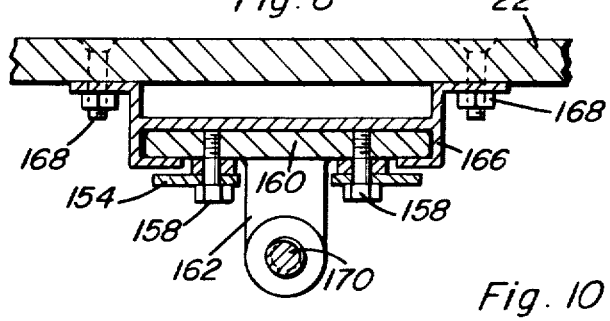
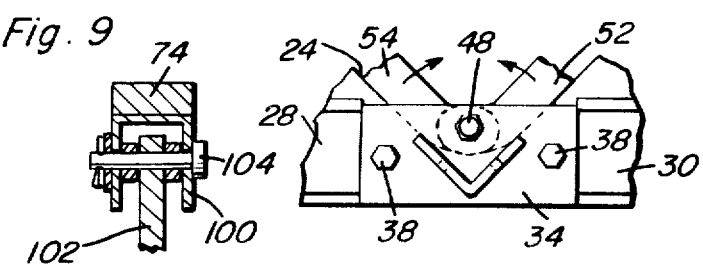
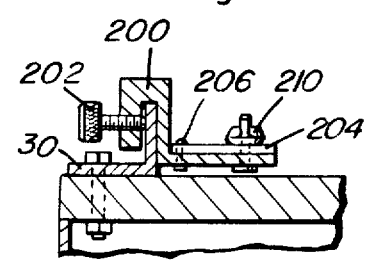

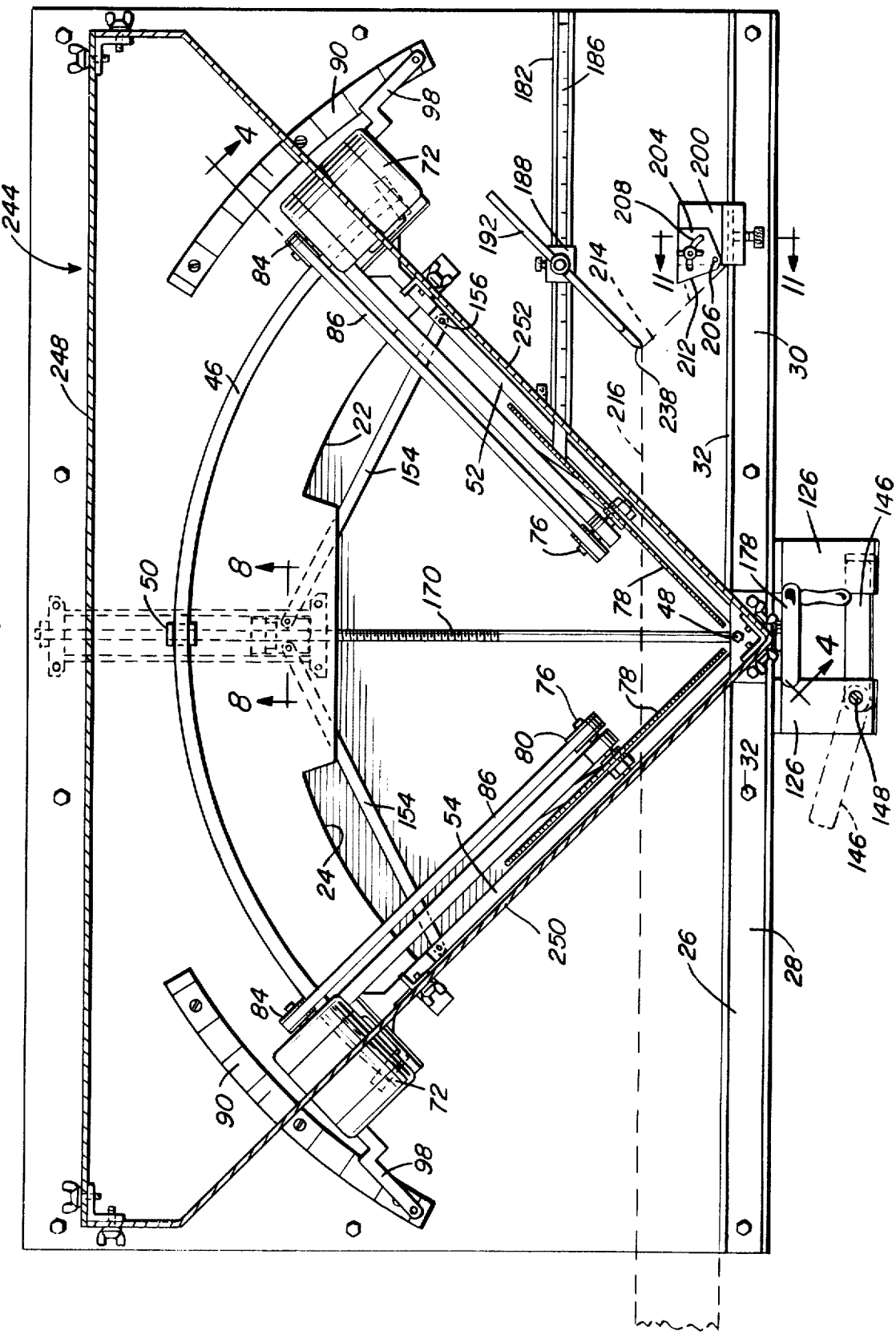

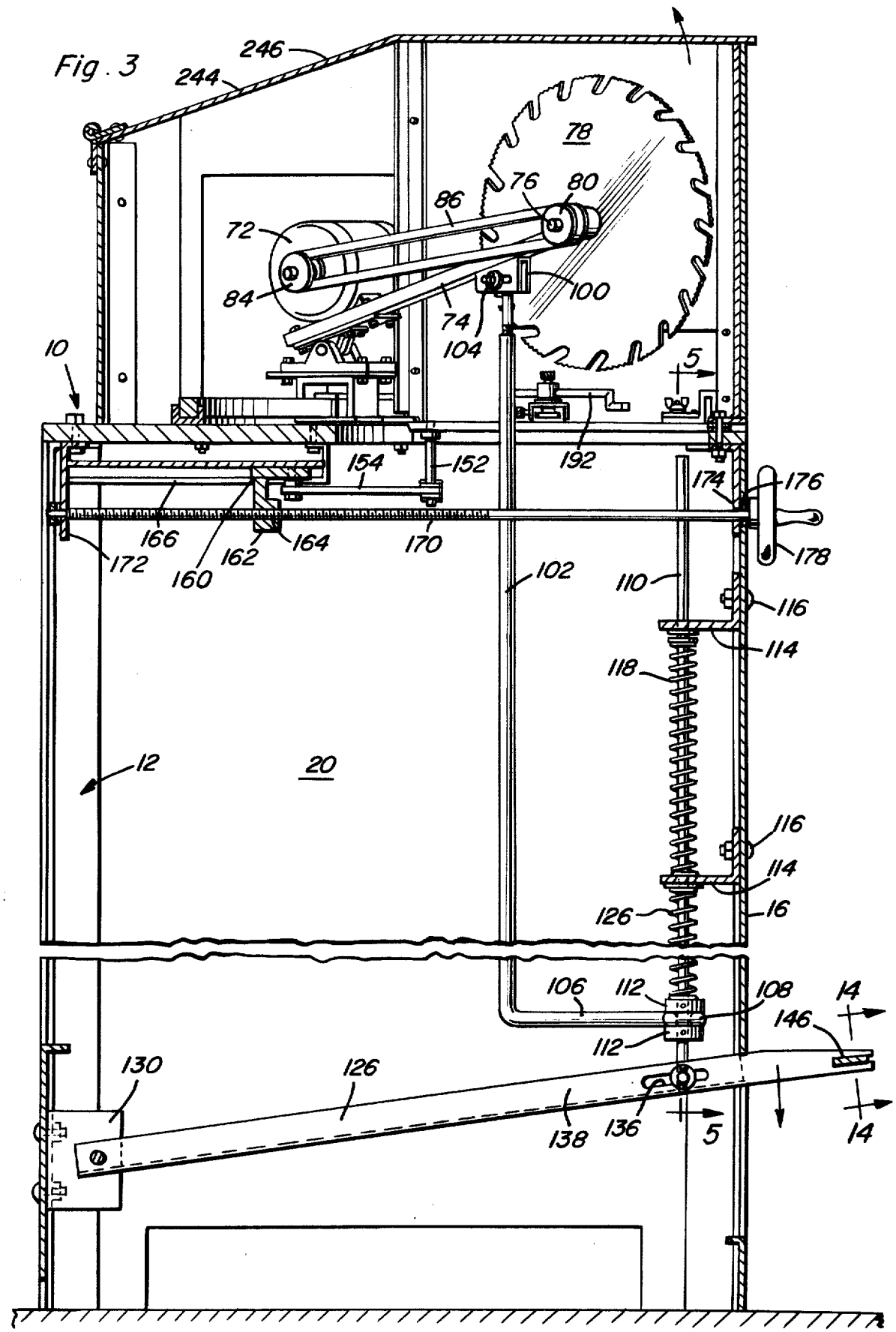

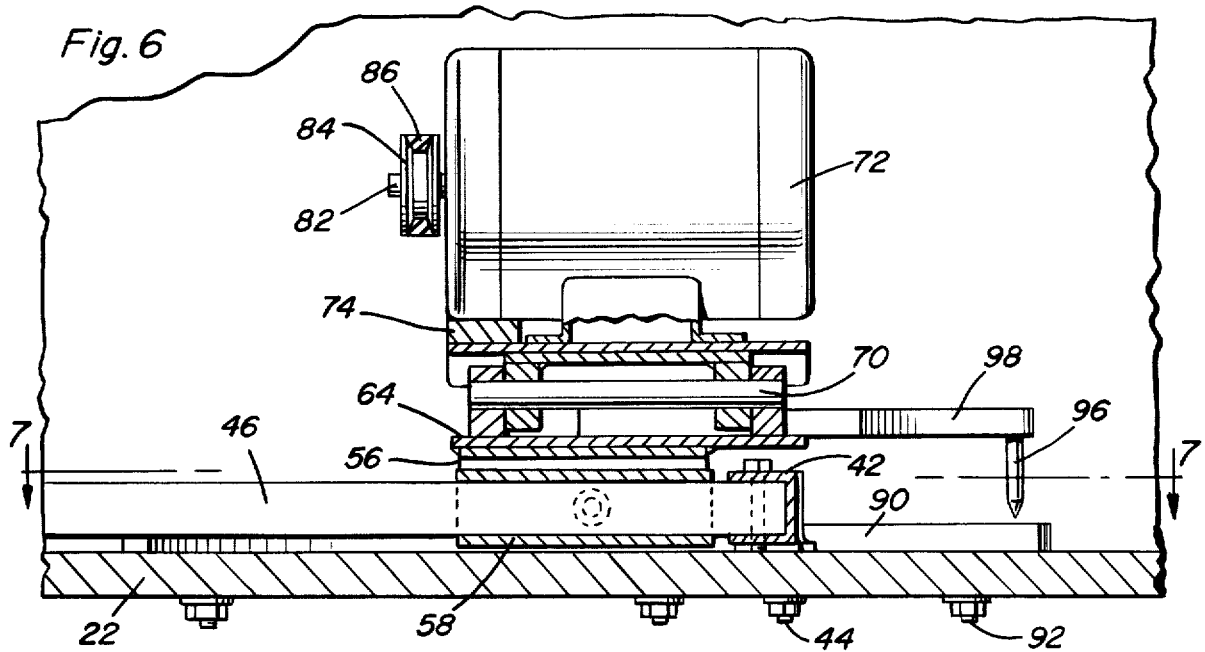
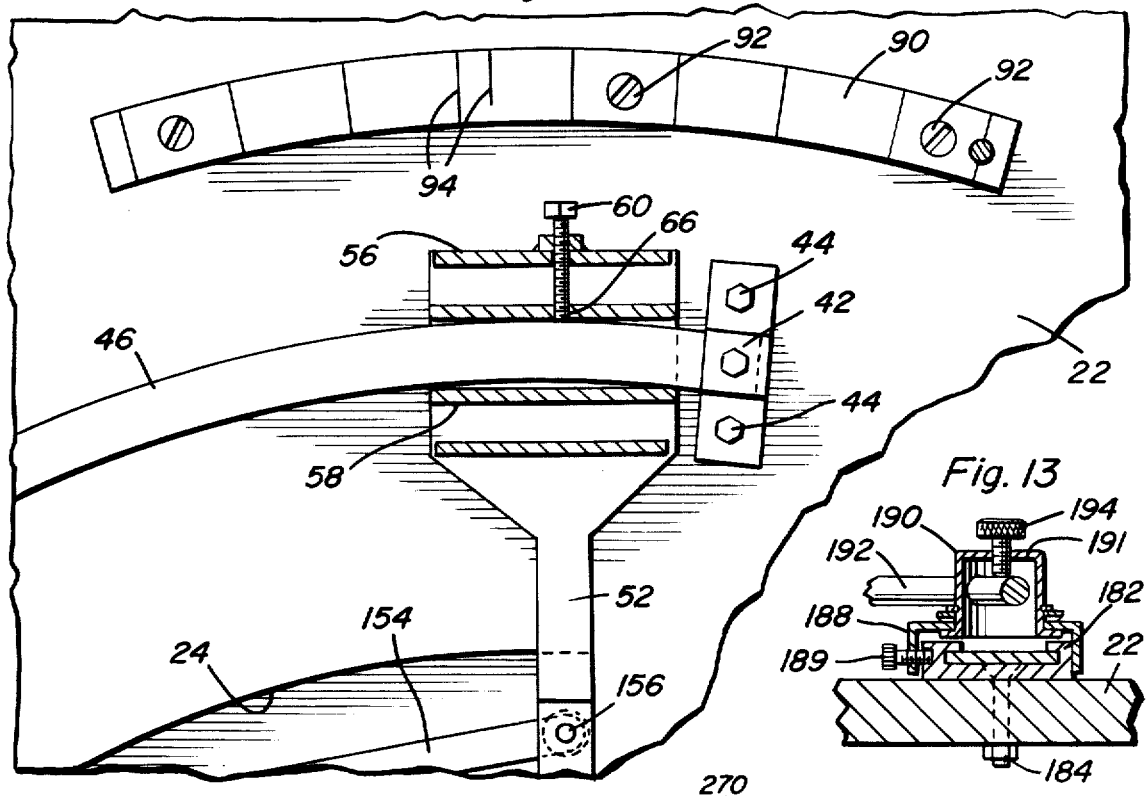
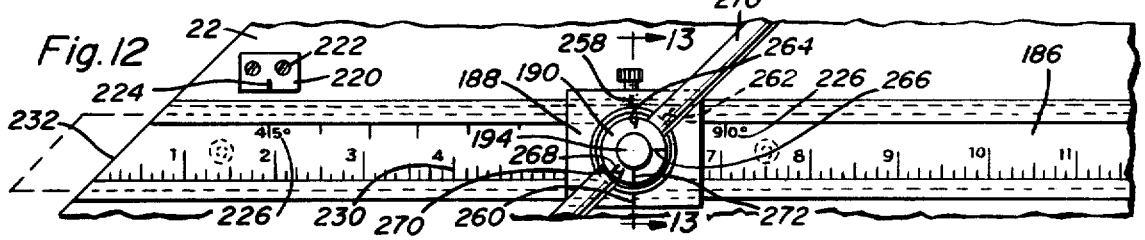

1

ADJUSTABLE ANGLE DOUBLE CUTTING MITRE CUT-OFF SAW

BACKGROUND OF THE INVENTION

Dual bladed cut-off saws of the type including a pair of independently adjustable rotary saw blades have been heretofore constructed. Examples of this type of dual rotary blade cut-off saw may be found in U.S. Pat. Nos. 3,578,043 to Donald C. Menge, dated May 11, 1971, 3,540,498 to Eugene L. Woloveke, dated Nov. 17, 1970 and 1,700,683 to Sern Madsen, dated Jan. 29, 1929.

However, these prior known dual rotary blade saws have not been constructed in a manner whereby the rotary saw blades may be selectively moved in unison or independently of each other in a cutting movement. In addition, these previously known saws require more than minimal adjustment time each time the cutting angle is changed or the length of the workpiece to be cut is changed and are considerably space consuming. Also, twin rotary saw bladed cut-off saws known heretofore for the most part require skilled operators and are designed for use in one particular manufacturing field.

BRIEF DESCRIPTION OF THE INVENTION

The double cutting mitre cut-off saw of the instant invention includes a structure whereby the rotary saws thereof may be independently actuated or actuated in unison and adjustments required for a change in the angle of cut and the length of the workpiece to be cut may be made in a minimum of time. Still further, the cut-off saw is constructed in a manner whereby it may be efficiently and safely operated even by relatively unskilled persons.

Considering the above, the main object of this invention is to provide an adjustable angle double cutting mitre cut-off saw of the rotary bladed type and constructed in a manner whereby the rotary blades thereof may be selectively operated in unison or independently of each other.

Another important object of this invention is to provide a saw in accordance with the preceding object which may be quickly adjusted to make an accurate change in the angle of cut and also in the length of the workpiece to be cut.

Yet another object of this invention is to provide a saw whereby the rotary blades thereof may be inversely angularly adjusted relative to a plane normal to the longitudinal centerline of the workpiece through the movement of a single adjustment member.

Another important object of this invention is to provide a saw in accordance with the preceding objects and which may also be utilized to make 90 degree end cuts in a workpiece.

A final object of this invention to be specifically enumerated herein is to provide a saw in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

FIG. 1 is a perspective view of the saw and its associated cabinet structure;

FIG. 2 is an enlarged fragmentary horizontal sectional view taken substantially upon the plane indicated by the section line 2—2 of FIG. 1;

FIG. 3 is an enlarged vertical sectional view taken substantially upon the plane indicated by the section line 3—3 of FIG. 1;

FIG. 5 is an enlarged fragmentary vertical sectional view taken substantially upon the plane indicated by the section line 5—5 of FIG. 3;

FIG. 6 is an enlarged fragmentary vertical sectional view illustrating the manner in which one of the rotary saw blade supporting structures is mounted for shifting along an arcuate horizontal path and swingable movement through a plane normal to the workpiece supporting surface;

FIG. 7 is a fragmentary horizontal sectional view taken substantially upon the plane indicated by the section line 7—7 of FIG. 6;

FIG. 8 is an enlarged fragmentary vertical sectional view taken substantially upon the plane indicated by the section line 8—8 of FIG. 2;

FIG. 9 is an enlarged fragmentary vertical sectional view taken substantially upon the indicated by the section line 9—9 of FIG. 4;

FIG. 10 is an enlarged fragmentary horizontal sectional view illustrating the manner in which the radius arms of the individual saw mounting structures are pivotally supported from coinciding vertical axes adjacent the center forward portion of the saw;

FIG. 11 is an enlarged fragmentary vertical sectional view taken substantially upon the plane indicated by the section line 11—11 of FIG. 2;

FIG. 12 is an enlarged fragmentary plan view illustrating the major portion of the workpiece length adjusting structure;

FIG. 13 is an enlarged fragmentary vertical sectional view taken substantially upon the plane indicated by the section line 13—13 of FIG. 12; and FIG. 14 is an enlarged fragmentary vertical sectional view taken substantially upon the plane indicated by the section line 14—14 of FIG. 3.

DETAILED DESCRIPTION OF THE INVENTION

Figure 4:
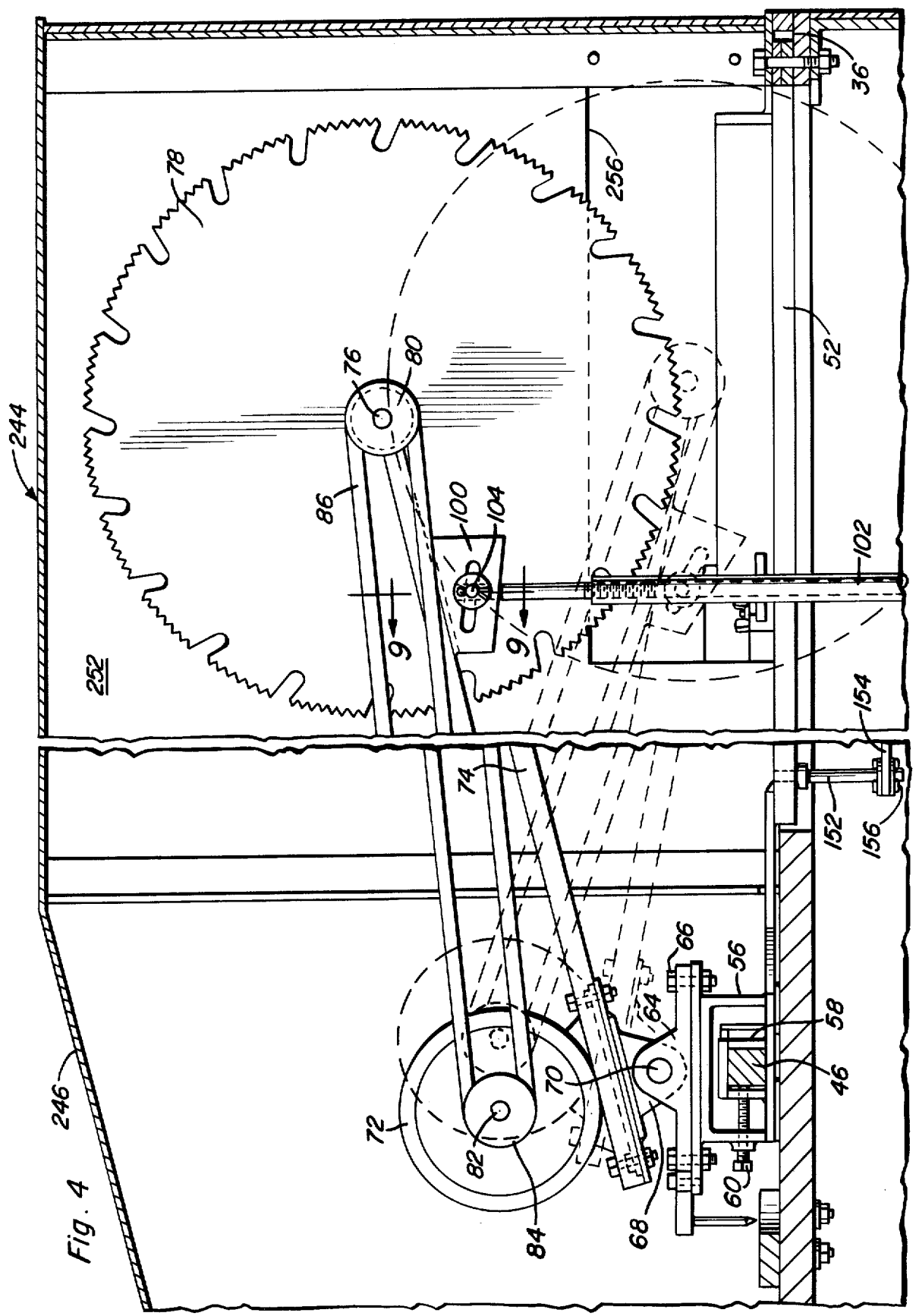
FIG. 4 is an enlarged fragmentary vertical sectional view taken substantially upon the plane indicated by the section line 4—4 of FIG. 2.

Referring now more specifically to FIGS. 1 and 3 of the drawings the numeral 10 generally designates the saw of the instant invention. The saw 10 includes an upright frame 12 enclosed within a cabinet 14 including a front wall 16 and opposite side walls 18 and 20. The top of the cabinet 14 and frame 12 is defined by a horizontal top plate 22 having a central opening 24 formed therethrough.

A workpiece guiding fence 26 including opposite end upwardly projecting angle sections 28 and 30 are secured over the upper surface of the forward marginal edge of the top panel 22 by fasteners 32 with the adjacent ends of the sections 28 and 30 slightly spaced apart and bridged by a center mounting plate 34 secured over a relieved central portion 36 of the forward marginal edge of the top plate 22 by means of fasteners 38.

A pair of opposite end brackets 42 secured to the top panel 22 by means of fasteners 44 anchor the opposite ends of an arcuate rail 46 to the top panel 22 with the center of curvature of the rail 46 coinciding with the center axis of a fastener 48 secured through the mounting plate 34 and the top panel 22 and to again be referred to hereinafter. The central portion of the rail 46 is supported by a slidable U-shaped spacer 50.

Corresponding ends of a pair of radius arms 52 and 54 are pivotally anchored by means of the fastener 48 and the remote ends of the radius arms 52 and 54 overlie the rear portion of the top panel 22 and have integral mounting frames 56 supported therefrom including sleeves 58 which slidably and guidingly receive the rail 46 therethrough. Each of the frames 56 includes a threaded setscrew 60 operable through a bore 62 to engage the rail 46.

Each of the mounting frames 56 also includes a mounting plate 64 secured thereto by means of fasteners 66 and each mounting plate 64 has a second mounting plate 68 pivotally supported therefrom by means of a pivot pin 70. Further, each mounting plate 68 supports an electric motor 72 and a swing arm 74 at its base end. The free swinging end of each support arm 74 rotatably journals a spindle 76 from which a saw blade 78 and a pulley wheel 80 is mounted. Each motor 72 includes a rotary output shaft 82 having a pulley wheel 84 mounted thereon aligned with the corresponding pulley wheel 80 and an endless drive member 86 in the form of a flexible belt is trained over each pair of pulley wheels 80 and 84 whereby each electric motor drives a corresponding saw blade 78.

The top panel 22 has a pair of arcuate gauge members 90 secured thereon by means of fasteners 92 and each arcuate gauge member 90 has indicia 94 thereon with which a pointer element 96 carried by an outwardly projecting support arm 98 supported from the corresponding mounting plate 64 is registrable in order to indicate the angle of inclination of the corresponding saw blade relative to the longitudinal centerline of the fence 26.

The underside of the free end portion of each support arm 74 includes a depending transversely slotted and bifurcated mount 100 between whose generally horizontally slotted furcations the upper end of an adjustable length pull rod 102 is pivotally and slidably secured by means of a through pin. The lower end of each pull rod 102 includes a forwardly projecting terminal end 106 having a forward eye portion 108 disposed on a guide rod 110 between abutment sleeves 112 secured in adjusted position along the guide rod 110. The guide rods 110 are slidably received through corresponding bores 112 formed in vertically spaced brackets 114 secured to the front wall 16 by fasteners 116. A pair of heavy compression springs 118 are secured about those portions of the rods 110 extending between the brackets 114 and the upper end of each compression spring 118 bears upwardly against a washer 120 underlying a crosspin 122 carried by the corresponding rod and disposed below an upper washer 124 on that rod 110 disposed below the upper bracket 114. A pair of lighter compression springs 126 are disposed on the lower end portions of the rods 110 below the lower bracket 114 and above the upper collar 112.

A pair of elongated treadle levers 126 extend in front-to-rear direction within the cabinet 14 and their forward ends project through a lower central opening 128 formed in the front wall 16. The rear ends of the levers 126 are pivotally supported from a bracket 130 and the levers 126 define upwardly opening channel members between whose side flanges horizontal sleeve portions 132 carried by the lower ends of the rods 110 are received. The sleeve portions 132 are pinned to the levers 126 by means of pins 134 secured through the sleeve portions 132 and longitudinal slots 136 formed in the side flanges 138 of the levers 126. The forward end portions of the levers 126 are slotted as at 142 and 144 and one end of a connecting strap 146 is pivotally anchored in the slot 142 by a fastener 148 and the other end of the connecting strap 146 is removably received in the slot 144 for selectively keying the forward ends of the levers 126 together.

It may thus be seen that downward movement on the forward ends of the levers 126 projecting through the opening 128 will cause the forward ends of the support arms 74 and the saw blades 78 supported therefrom to swing downwardly toward the top plate 22 and into the opening 24 to the approximate dotted line position of the saw blades 78 illustrated in FIG. 4 of the drawings. Downward movement of the levers 126 is opposed by the compression springs 118 and when the forward ends of the levers 126 are released the springs 118 bias the guide rods 110 and the pull rods 102 upwardly toward their rest positions, the compression springs 126 serving to cushion the return of the support arms 74 and pull rods 102 to their rest positions. Also, if the connecting strap 146 has its free swinging end received in the slot 144, the forward ends of the levers 126 are keyed together for simultaneous up-and-down movement. However, if it is desired to independently actuate the support arms 74, the connecting strap 46 may be swung out of the slot 44 and to the opposite side of the corresponding lever 126 whereby the forward end of each lever 126 may be independently depressed.

Each radius arm 52 includes a depending pin 152 to which one end of a connecting link 154 is pivotally secured as at 156. The other ends of the connecting links 154 are pivotally secured, as by fasteners 158, to a follower 160 including a depending arm 162 having a threaded horizontal bore 164 formed therethrough. The follower 160 is supported from a guide frame 166 secured to the underside of the top panel 22 by means of fasteners 168 and a front-to-rear extending threaded adjustment screw 170 is threaded through the bore 164 and has its rear end journaled through a depending portion 172 carried by the rear end of the guide frame 166. The forward end of the adjusting screw 170 is journaled through a forward frame portion 174 and received through an opening 176 formed in the front wall 16 and has a crank 178 mounted thereon. The guide frame 166 supports the follower 160 for movement along a path disposed in a vertical plane normal to the central portion of the fence 26 and it will be noted that rotation of the adjustment screw 170 will inversely angulate the radius arms 52 and the support arms 74 relative to the center plane along which the follower 160 is adjustable.

A guide channel 182 extends along the upper surface of one side of the top panel 22 and is secured thereto by means of fasteners 184. A measuring rule 186 is slidably keyed in the guide channel 182 for adjustable positioning therealong and a support frame 188 is also mounted on the guide channel 182 for adjustable positioning therealong and is provided with a setscrew 189 for releasably securing the support frame 188 in adjusted position along the guide channel 182. A mount 190 is rotatably supported from the frame 188 and a pointer arm 192 is slidingly received through the mount 190, the latter including a setscrew 194 for releasably securing the pointer arm 192 in adjusted position relative to the mount 190.

Also, a mounting bracket 200 is mounted on the end section 30 of the fence 26 and is slidable therealong. The bracket 200 includes a setscrew 202 for retaining the bracket 200 in adjusted position and an abutment plate 204 is pivoted to the bracket 200 as at 206 and includes an arcuate slot 208 through which a fastener 210 carried by the bracket 200 is received. The fastener 210 may be loosened and the abutment plate 204 may be adjusted so that its edge 212 may be inclined in order to abut the mitre cut end 214 of a workpiece 216 extending along the fence 26.

It may further be seen from FIGS. 2 and 12 that the top panel 22 includes an indexing plate 220 secured thereto by means of fasteners 222. The plate 220 includes indicia 224 registrable with indicia 226 on the measuring rule 186 and it will be noted that the measuring rule 186 also includes indicia 230. When the indicia 226 is registered with the indicia 224 and the radius arms 52 and 74 are disposed at 45° relative to the fence 26, the beveled edge or end 232 on the rule 186 may be abutted against the outer face of the adjacent blade 78. Then, with the mount 90 adjusted so that the pointer arm 90 is also disposed at 45° relative to the fence 26 as indicated by the indicia 234 on the frame 188 and 236 on the mount 190, the pointed end 238 of the pointer arm 192 may be engaged with the adjacent corner of the workpiece 216 whereupon the registry of the frame 188 with the indicia 230 will indicate the length of the shorter longitudinal side of the workpiece 216 after the workpiece 216 has been cut by the right-hand saw blade 78 as seen in FIG. 2. Also, in order to properly position the workpiece 216 the abutment plate 204 is angularly displaced so that the edge 212 abuts the mitre cut edge 214 of the workpiece 216.

The frame 188 is provided with opposite side indicia registering marks 258 and 260 extending generally radially of the axis of rotation of the mount 190 and a third indica registering mark 262 which also extends radially of the axis of rotation of the mount 190. Further, the top wall 191 of the mount 190 is provided with indicia marks 264 and 266 registrable with the indicia marks 258 and 262, respectively, and indicia registering marks 268, 270 and 272 registrable with the indicia registering markd 260. The marks 264 and 266 registrable with the marks 258 and 262, respectively, indicate positions of the pointer arm 192 inclined 54° and 90°, respectively, relative to the fence 26. In addition, the marks 272, 270 and 268, when registered with the mark 260, indicate positions of the pointer arm 192 inclined 45°, 60° and 67 ½°, respectively, relative to the fence 26.

The structure illustrated in FIG. 11 and in the lower right-hand portion of FIG. 2 comprises a stop for moulding being cut. After the stock has been brought forward and the first angle or straight cut is made on the end by the first saw blade 78, the moulding is slid to the other side, the rule is slid forward until the desired indicia 226 indicating the angle of the cut is aligned with the indicia 224. Then, the pointer arm 192 is rotated until the corresponding angle indicia, as for example the indicia marks 272 and 260 indicating a 45° angle, are registered with each other. Thereafter, the setscrew 194 is loosened and the pointer arm 192 is slid to a position with the tip 238 thereof contacting the inside corner of the moulding or workpiece 216 illustrated in phantom lines in FIG. 2 of the drawings. After this has been accomplished, the setscrew 198 is loosened and the support frame 188 is slid along the guide channel 182 until the desired indicia 230 is registered with the edge of the frame 188 to indicate the desired length of cut. Thereafter, the bracket 200 and the abutment plate 204 supported therefrom are adjusted relative to the end section 30 and the bracket 200, respectively, until the edge of the abutment plate 204 abuts the previously cut beveled end 214 of the workpiece 216. Thereafter, the second cut of the workpiece 216 may be made and all subsequent cuts of similar workpieces may be quickly accomplished.

That portion of the saw 10 which projects appreciably above the top panel 22 is covered by a shroud 244 including hinged top and rear panels 246 and 248 and forwardly convergent stationary side panels 250 and 252 each having corresponding openings 254 and 256 formed therein for reasons believed to be obvious from FIG. 1 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cut-off saw including a base provided with means defining a workpiece support surface, a pair of driven saw blades, mounting means supporting said blades in relatively angulated planes generally normal to said surface and with corresponding marginal portions of said blades closely adjacent each other and the line along which said planes intersect, for movement in said planes toward and away from said surface, and for angular displacement of said blades relative to said surface about axes at least closely adjacent and generally paralleling said line.

2. The combination of claim 1 including a workpiece guiding fence adjacent, extending along and projecting outwardly from said surface, said mounting means for movement of said blades toward and away from said surface including means swingably supporting said blades for angular displacement about axes generally paralleling said surface, disposed substantially normal to said planes and spaced considerably outwardly from said fence.

3. The combination of claim 1 wherein said axes coincide.

4. The combination of claim 3 wherein said axes and said line coincide.

5. The combination of claim 4 wherein said planes extend along the remote sides of said saw blades.

6. The combination of claim 1 including a workpiece guiding fence adjacent, extending along and projecting outwardly from said surface, adjustment means releasably connected between said mounting means and said support surface operative to inversely angularly displace said saw blades about said axes with said saw blades maintained equally oppositely angulated relative to a center plane normal to said surface and said fence.

7. The combination of claim 6 wherein either of said blades, upon disconnection of said adjustment means, may be angularly adjusted to a position at least substantially coinciding with said center plane.

8. The combination of claim 1 wherein said axes at least substantially coincide, said mounting means including a pair of mounting blocks guidingly supported from said base for movement along an arcuate path disposed in a plane generally paralleling said support surface and having said axes as its center of curvature, said mounting blocks each including an arm projecting generally radially inwardly toward said axes, said saw blades being journaled from the inner end portions of said arms, said arms each being pivotally supported at the outer end portions from said blocks for angular displacement about axes generally normal to the planes in which said blades rotate.

9. The combination of claim 8 including arm displacing means operatively connected to said arms for angularly displacing the latter relative to said blocks, said arm displacing means including remote actuating means selectively operable to independently and simultaneously angularly displace said arms relative to said blocks.

10. The combination of claim 9 including motor means mounted on the outer end portions of said arms drivingly coupled to said saw blades.

11. The combination of claim 10 wherein said saw blades are mounted on spindles journaled from the inner ends of said arms, said motor means including rotary output shafts generally paralleling said spindles, corresponding spindles and shafts having aligned driven and drive wheels mounted thereon, and an endless flexible drive member trained about each pair of aligned wheels.

12. The combination of claim 1 wherein said mounting means include a pair of radius arms having one pair of corresponding ends thereof pivotally anchored to said base for angular displacement about said axes, said radius arms generally paralleling said support surface, said saw blades being journaled from corresponding ends of a pair of support arms having the other ends thereof pivotally supported from the free ends of said radius arms for rotation about axes generally paralleling said support surface and extending transversely of said support and radius arms.

13. The combination of claim 1 including a shiftable actuator for each of said saw blades operable to shift the corresponding saw blade toward and away from said support surface, and means operatively associated with said actuators operative to couple the latter together for simultaneous movement to effect simultaneous shifting of said saw blades toward and away from said support surface.

* * * * *